US012036575B2

(12) United States Patent
Acosta

(10) Patent No.: US 12,036,575 B2
(45) Date of Patent: Jul. 16, 2024

(54) CAULKING GUN

(71) Applicants: Luis A. Acosta, Wichita, KS (US); Yadira A. Acosta, Wichita, KS (US)

(72) Inventor: Luis A. Acosta, Wichita, KS (US)

(73) Assignees: Luis A. Acosta, Wichita, KS (US); Yadira A. Acosta, Wichita, KS (US)

( * ) Notice: Subject to any disclaimer, the term of this patent is extended or adjusted under 35 U.S.C. 154(b) by 0 days.

(21) Appl. No.: 17/495,654

(22) Filed: Oct. 6, 2021

(65) Prior Publication Data

US 2022/0023910 A1 Jan. 27, 2022

Related U.S. Application Data

(63) Continuation-in-part of application No. 16/817,015, filed on Mar. 12, 2020, now abandoned.

(51) Int. Cl.

| | |
|---|---|
| ***B25F 1/02*** | (2006.01) |
| ***B05C 17/01*** | (2006.01) |
| ***B25F 1/00*** | (2006.01) |

(52) U.S. Cl.
CPC .......... *B05C 17/0123* (2013.01); *B25F 1/006* (2013.01)

(58) Field of Classification Search
CPC .... B25F 1/006; B25F 1/02; B25F 1/04; B25F 1/00; B25F 1/003; B65D 1/00; B65D 1/02; B65D 1/04; B65D 1/16; B25D 1/02
USPC .............................. 81/20, 25, 26; 7/143, 167
See application file for complete search history.

(56) References Cited

U.S. PATENT DOCUMENTS

| | | | | | |
|---|---|---|---|---|---|
| 3,793,656 | A * | 2/1974 | Songer | G01M 1/326 | 254/131 |
| 4,183,385 | A * | 1/1980 | Burkybile | B25D 1/02 | 30/308.3 |
| 4,440,206 | A * | 4/1984 | Dart | B25G 3/30 | 403/324 |
| 5,526,719 | A * | 6/1996 | Chen | B25D 1/02 | 81/26 |
| 6,332,376 | B1 * | 12/2001 | Hurley | B25D 1/02 | 81/23 |
| 6,457,384 | B1 * | 10/2002 | Cox | B25D 1/12 | 81/22 |
| 6,463,832 | B1 * | 10/2002 | Cox | B25D 1/12 | 81/22 |
| 8,468,630 | B2 * | 6/2013 | Barnhart | B25B 27/0078 | 81/26 |
| 9,332,872 | B1 * | 5/2016 | Eldridge | A47G 27/0487 | |
| 2006/0010678 | A1 * | 1/2006 | Parent | B25D 1/04 | 29/525 |

(Continued)

*Primary Examiner* — Charles P. Cheyney
(74) *Attorney, Agent, or Firm* — Kenneth H. Jack; Davis & Jack L.L.C.

(57) ABSTRACT

A caulking gun incorporating a caulk tube receptacle having a dispensing end a handle end; a plunger rod having a dispensing end and having a handle end, the dispensing end of the plunger rod extending toward the caulk tube receptacle's dispensing end and the handle end of the plunger rod extending away from the caulk tube receptacle's handle end; a trigger actuator operatively supporting the plunger rod at the caulk tube receptacle's handle end; a hammerhead; and a mounting sleeve fixedly attaching the hammerhead to the handle end of the plunger rod, the caulking gun being alternatingly usable as a caulk applying tool and as a hammer for resetting protruding nail heads.

4 Claims, 7 Drawing Sheets

(56) References Cited

U.S. PATENT DOCUMENTS

| | | | | |
|---|---|---|---|---|
| 2011/0113565 | A1* | 5/2011 | Huffman | B25D 1/02 81/20 |
| 2011/0314614 | A1* | 12/2011 | Barnhart | B25B 27/0078 29/426.6 |
| 2013/0025102 | A1* | 1/2013 | Barnhart | B25F 1/006 29/239 |
| 2015/0360362 | A1* | 12/2015 | Chapman | B25F 1/02 7/167 |
| 2017/0043468 | A1* | 2/2017 | Wade | B25F 1/006 |

* cited by examiner

CAULKING GUN

CONTINUATION IN PART STATUS OF APPLICATION

The instant application constitutes a Continuation in Part of U.S. patent application Ser. No. 16/817,015 entitled “Caulking Gun”, filed Mar. 12, 2020. The instant application is filed prior to any abandonment or issuance of said ’015 application. The inventor, assignees, and applicants of the instant application and those of said ’015 application are the same those of the instant application, they being Luis A. Acosta, inventor, assignor, and co-applicant; and Yadira A. Acosta, assignee and co-applicant. Structures and functions of structures disclosed in said ’015 application and those of the instant application are substantially the same. The benefit of and priority from said ’015 application is hereby claimed to the extent of said application’s disclosure.

FIELD OF THE INVENTION

This invention relates to caulking guns of the type including a caulk tube receptacle or frame, such guns further having a handle and trigger actuator assembly for holding and directing the gun and for trigger actuated driving a caulk dispensing plunger rod. More particularly, this invention relates to special adaptations of such caulking guns which are directed to making them more functional during use in painting preparation processes.

BACKGROUND OF THE INVENTION

Painting preparation work performed upon a building having exterior wall boards commonly includes a step of applying water sealing caulking at the edges of the wall boards and at exposed nail heads. Nails commonly used to hold wall boards upon underlying wall frame members may create water incursion pathways which may lead to water rot. A common remedial practice applies the caulk at the sites of the nail heads during painting preparation, such practice sealing the nail heads and assuring that water incursions and water rot does not occur at the nail heads.

Workers who perform painting preparation work often find nail heads which are raised a short distance above the wall surface. Expansions and contractions of the wall board occurring during successive winter and summer months are known to undesirably draw nail heads away from their originally set and flush configurations. Application of sealing caulk to such nails is particularly needed. However, prior to any application of caulk, a raised nail must be driven back to its original seated and flush configuration. In situations where the worker performing the caulking preparation is situated at the top of a ladder, the worker often utilizes one of his or her hands to secure and balance himself upon the ladder. The worker’s other hand is typically occupied with wielding and manipulating a caulking gun. Where a raised nail head is encountered, such occupations of the worker’s hands make it inconvenient and difficult for the worker to reset the nail. The worker’s hand which is occupied with holding and balancing upon the ladder is typically of no assistance in resetting the nail. The worker’s other hand which holds the caulking gun is similarly disabled from assisting in resetting the nail. Performing additional steps of releasing and temporarily storing the caulking gun, accessing and retrieving a separate hammer tool, utilizing the hammer to set the nail, returning the hammer to its storage place, and retrieving the caulking gun for continued caulking are cumbersome, awkward, and time consuming.

The instant inventive caulking gun solves or ameliorates problems, defects, deficiencies, and challenges discussed above by providing a specially adapted caulking gun which is capable of alternatively functioning as a nail setting hammer.

BRIEF SUMMARY OF THE INVENTION

A first structural component of the instant inventive caulking gun comprises a caulk tube receptacle or frame having a caulk dispensing end and having a handle end. In the preferred embodiment, the caulk tube receptacle is specially fitted and adapted for receiving a standard sized caulk tube.

A further structural component of the instant inventive caulking gun comprises a plunger rod having a dispensing end and having a handle end. In the preferred embodiment, the plunger rod has a piston driving disk or plate mounted to its dispensing end. Such plunger rod commonly has a hook, often configured as an “L”, formed via a bend at its handle end. Alternatively, such hook may be “C” configured.

A handle and trigger actuator mechanism is preferably incorporated at the handle end of the receptacle, such mechanism supporting and longitudinally driving the plunger rod toward the dispensing end of the receptacle. In a preferred embodiment, the actuator mechanism comprises a pair of shaft binding slip plates wherein a longitudinal plate drives the plunger rod longitudinally and wherein an oppositely longitudinal slip plate resists any oppositely longitudinal motion of the lunger rod while the longitudinal slip plate is drawn oppositely longitudinally.

Where a caulk tube is received within the receptacle, actuation and manipulation of the trigger actuator drives the plunger rod longitudinally within the bore of a caulk tube, driving the caulk tube’s piston toward the tube’s caulk dispensing end, thereby dispensing caulk from the caulk tube’s dispensing tip.

A further structural component of the instant inventive caulking gun comprises a hammerhead which is preferably composed of steel and has a mass sufficient to effectively set a protruding nail head.

Means for mounting the hammerhead component upon the handle end of the plunger rod are preferably provided. Where the plunger rod’s hook or pull handle is “L” configured, such means may comprise a welded, wholly formed, helically threaded, pressure fitted, clamping, or adhesively bonded attachment of the hammerhead to a distal end of the plunger rod’s hook or pull handle. In a suitable embodiment, the mounting means comprise a pin and socket joint wherein the joint’s pin half comprises a distal end of the plunger rod’s “L” configured hook. The socket half of such joint suitably comprises the bore of a steel sleeve, the hammerhead being welded to a distal end of such sleeve. Where the plunger rod’s hook is alternatively “C” configured, the attaching joint may be configured as a “U” channel which incorporates a pair of set screws. Such screws may be provided at the opposing walls of the “U” channel for securely holding and clamping against the upper arm of such “C” configured hook.

Provision of the above described pin and socket joint means for mounting the hammerhead allows the sleeve portion of the joint to perform an ergonomic function of effectively increasing the radius of curvature of the plunger rod’s pull handle. A common “L” configured caulk gun pull handle has a cross sectional diameter between ¼" and ⅜".

In contrast, the sleeve's cross sectional outside diameter is preferably between ½" and ⅝". A user's rearward finger pull against such ½"-⅝" radius contact surface provides more comfort to the user upon pulling against the handle.

In use of the instant invention, and assuming that pin and socket joint hammerhead mounting means are provided, an operator may initially grasp the inventive caulking gun in one hand and may grasp the sleeve component in his or her other hand. Thereafter, the operator may depress the caulking gun's plunger rod release latch, and may pull rearwardly upon the enlarged cylindrical outer surface of the sleeve. Such rearward pulling translates to the hook, oppositely longitudinally withdrawing the plunger rod's piston driving disk from the interior of the caulk tube. Where the caulk tube is spent and is in need of removal from the receptacle and disposal, such plunger rod withdrawal is needed. The effective increase of radius of curvature of the hook provided by the sleeve component provides comfort and security in utilizing fingers to effect the needed pull upon the plunger rod.

In the alternative hammering use of the instant inventive caulking gun, an operator may grasp the gun via its caulk tube receptacle (and via a caulk tube received within the receptacle). Thereafter, the operator may swing the handle end of the caulking gun toward a nail to be reset. Such swinging motion is preferably guided so that the hammerhead component may percussively strike the nail head, advantageously driving and resetting the nail head. Thereafter, the caulking gun may be further alternatively utilized in a conventional fashion to apply caulk at the site of the reset nail head.

Accordingly, objects of the instant invention include the provision of a caulking gun which incorporates structures as described above, and which arranges those structures in manners described above, for the achievement and performance of beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
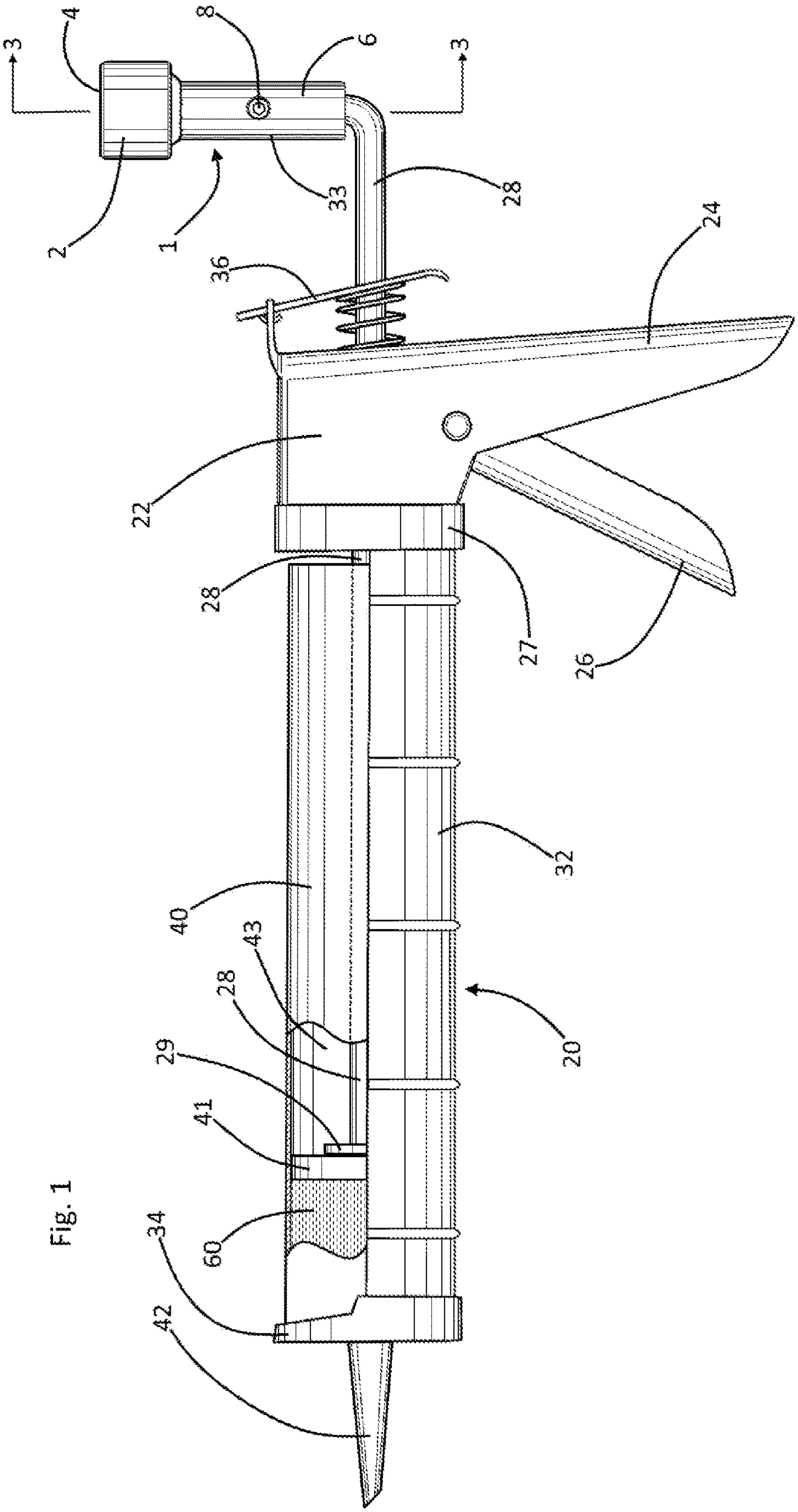
FIG. 1 is a side view of the instant inventive caulking gun, the view including a cut away section exposing internal structures.
Figure 5:
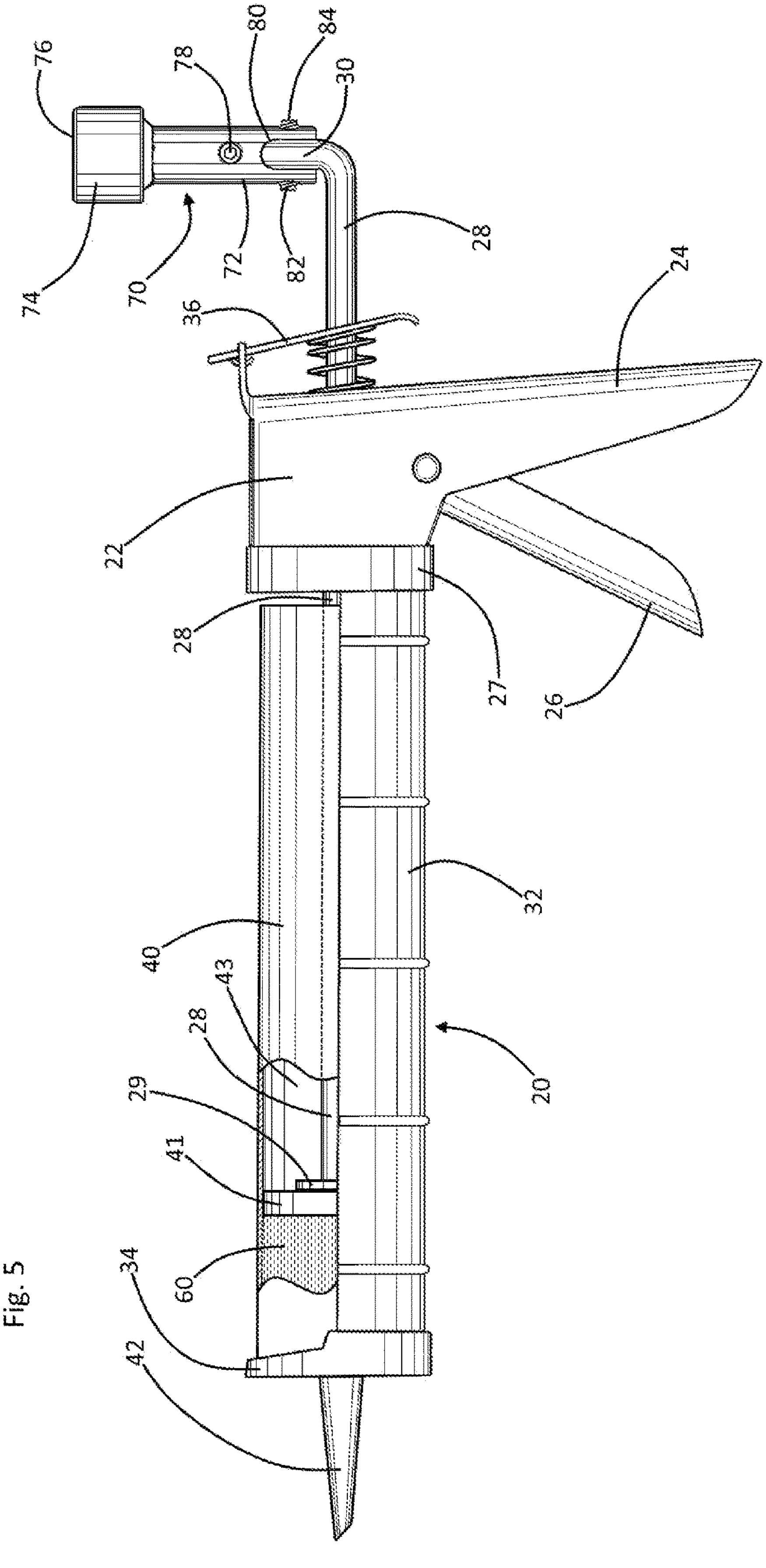
FIG. 5 presents an alternate configuration of structures presented in FIGS. 2 and 3.

Referring now to the drawings and in particular to Drawing FIG. 1, a suitable embodiment of the instant inventive caulking gun is referred to generally by Reference Arrow 20. The caulking gun 20 includes a frame or receptacle member 32 which is closely fitted and adapted for receiving a conventional piston type caulk dispensing tube 40, such tube having a forward or longitudinal caulk dispensing nipple 42. A forward bracket 34 captures and retains the dispensing end of the tube 40. Referring to FIG. 5, a plunger rod 28 has a dispensing end piston driving plate 29 which, upon longitudinal extension within the hollow bore 43 of tube 40, may engage and longitudinally drive the tube's internal piston 41. Longitudinal driving of the piston 41 ejects caulk 60 forwardly through nipple 42.

A plunger rod driving mechanism, preferably including at least a first shaft binding slip plate (not depicted within views) within handle housing 22, may be actuated via finger pressure imposed reciprocating movements of a trigger portion 26 of the caulk gun's rear handle 24. Manual rearward squeezing of trigger 26 toward handle 24 actuates the at least first slip plate to progressively drive the plunger rod 28, longitudinally driving plunger disk 29 against piston 41, and forwardly dispensing the caulk 60 out of nipple 42. While the caulk is under pressure from such trigger actuated driving action, and while the at least first slip plate is being retracted for a next successive longitudinal piston driving stroke, a second shaft binding slip plate 36 advantageously resists any oppositely longitudinal motion of the piston 41, the plate 29, and the plunger rod 28.

Figure 2:
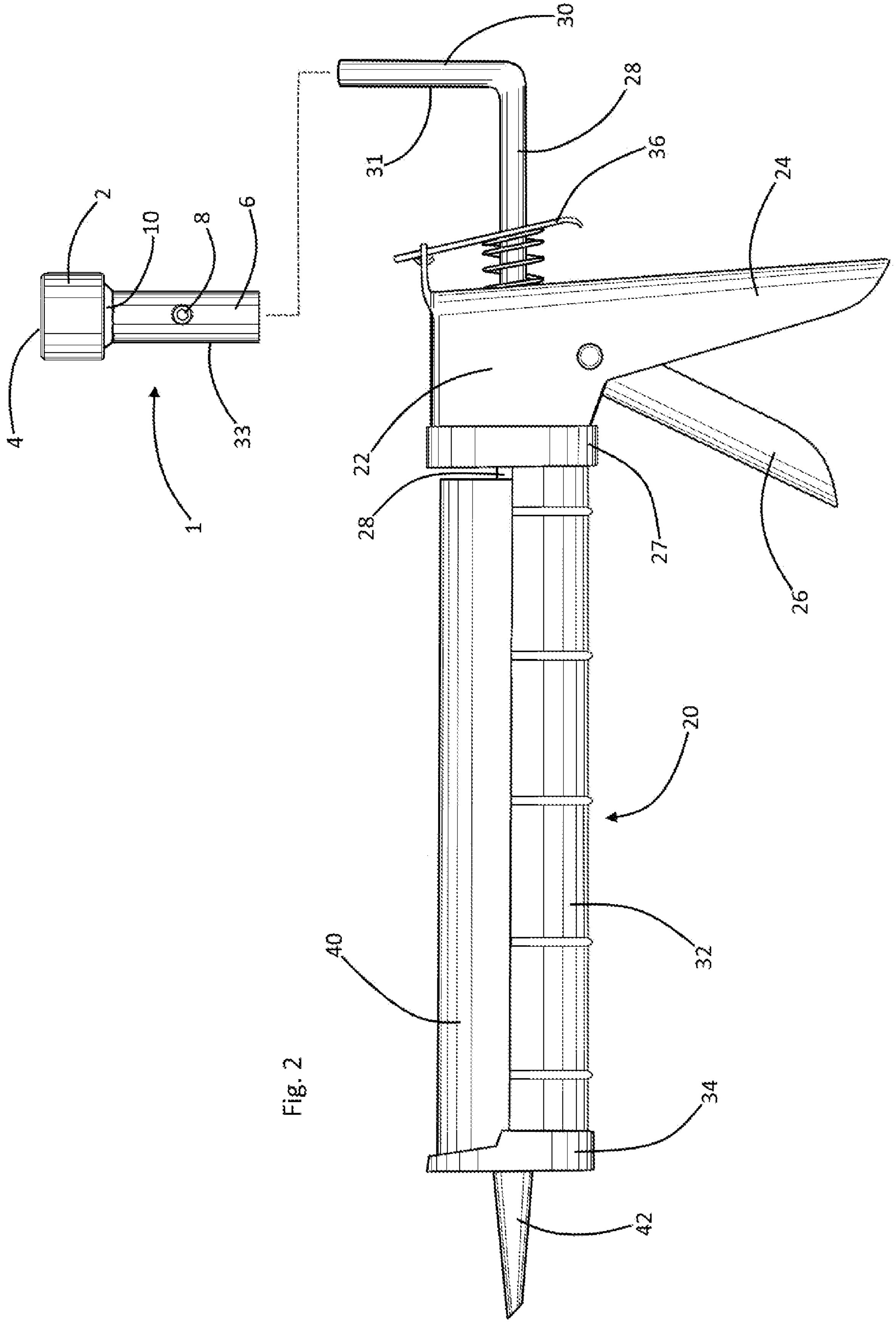
FIG. 2 redepicts the structure of FIG. 1, the view of FIG. 2 showing a hammerhead and mounting sleeve component in an exploded view.
Figure 3:
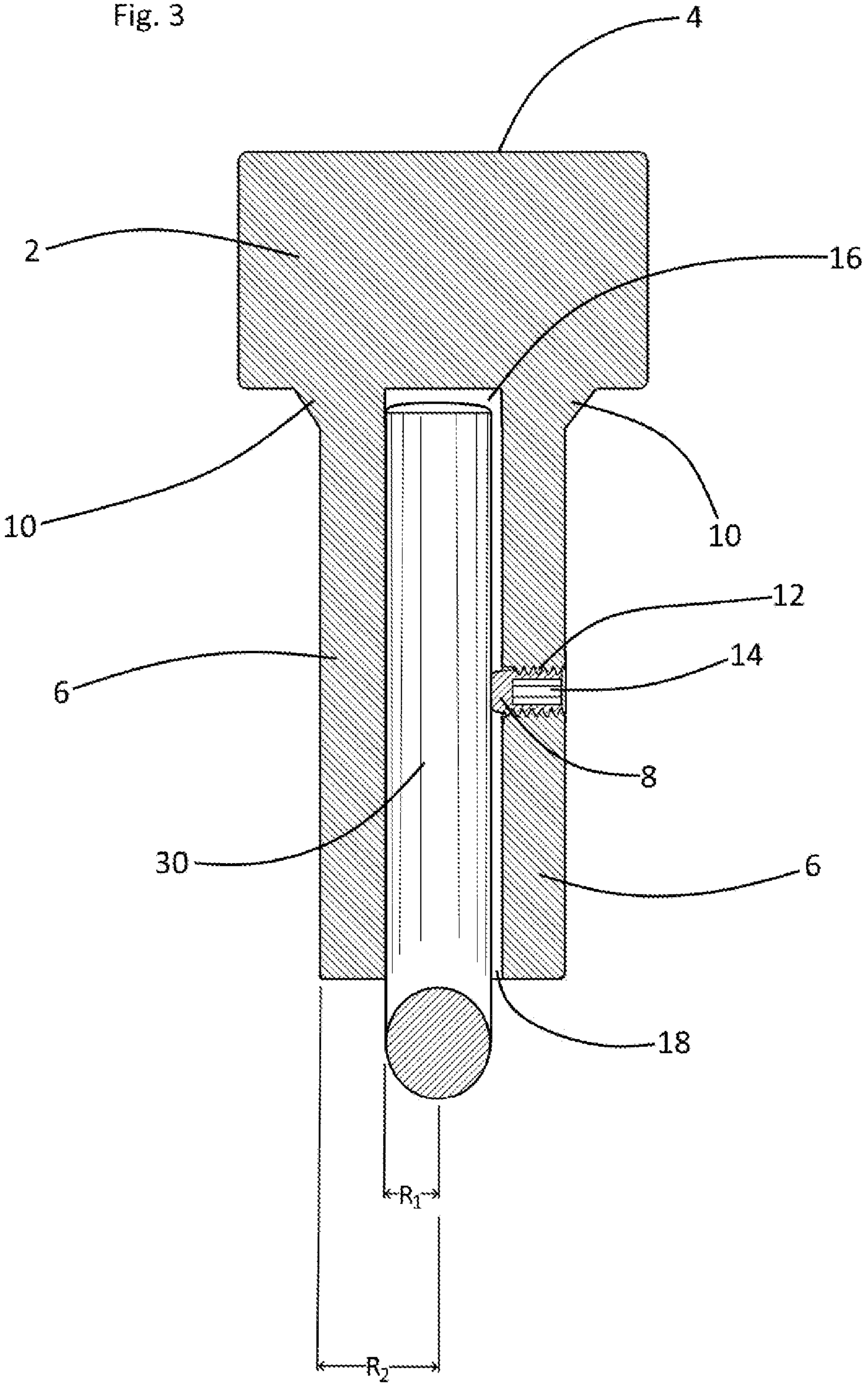
FIG. 3 is a sectional view, as indicated in FIG. 1.

Referring simultaneously to FIGS. 1-3, a hammerhead assembly 1 is suitably provided, such assembly including a hammerhead 2 having a strike face 4, and having a cylindrical mounting sleeve 6. A hollow bore 16 component of the hammerhead assembly 1 has a proximal opening 18 which is fitted for nesting receipt of a hook 30 formed at the handle end of the plunger rod 28, such hook 30 commonly being configured as an "L". The hammerhead 2 may suitably be fixedly attached to a distal end of the sleeve 6 by a heat fusion weld 10. A helically threaded set screw 8 extends through a side wall threaded aperture 12 for secure impingement against a side wall of the hook 30, such set screw 8 having a hexagonal Allen wrench receiving socket 14.

In a suitable embodiment, the longitudinal aspect or face 31 of the hook 30 has a radius of curvature $R_1$. Correspondingly, the radially outwardly overlying sleeve 6 has a substantially larger radius of curvature $R_2$. In a suitable embodiment, curvature $R_2$ is at least twice as great as the curvature $R_1$. Such differential in curvatures ergonomically enhances the area of finger contact during use of the hook as a pull handle. Where an operator pulls rearwardly upon handle 30, the relatively small diameter of such handle 30 may uncomfortably impinge sharply against the fingers of the operator's hand, and the provision of sleeve 6 operates to relieve such discomfort.

It may be noted that a common length or extension of the "L" hook 30 is 1½"-2½". In order to prevent an operator's finger from passing beneath the proximal end of the sleeve 6 during pulling use, the sleeve 6 preferably has a matching length or extension between 1½"-2½".

Figure 4:
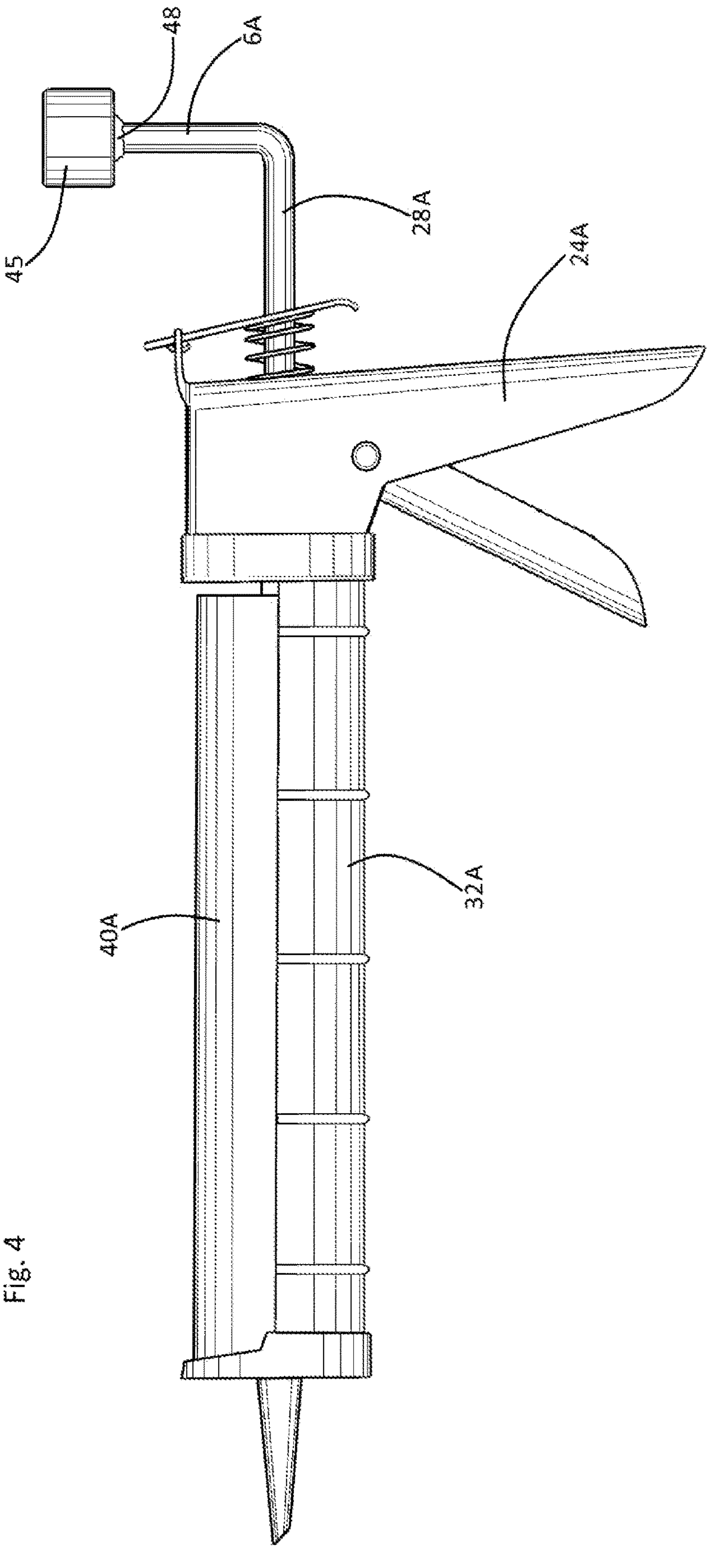
FIG. 4 presents an alternative configuration of the structure depicted in FIG. 1.

Referring to FIG. 4, each structure which is identified by a reference numeral having a suffix "A" is configured substantially identically with similarly numbered structures appearing in FIGS. 1-3. The sleeve 6 of Drawing FIGS. 1, 2, and 3, and the heat fusion weld 48 of FIG. 4 are intended as being representative of other means for pull handle mounting the hammerhead 2 (or 45 as the case may be). Helically and threaded joints, pressure fitted joints, wholly formed joints, clamp joints, and adhesively bonded joints are considered to fall within the scope of said means.

Figure 6:
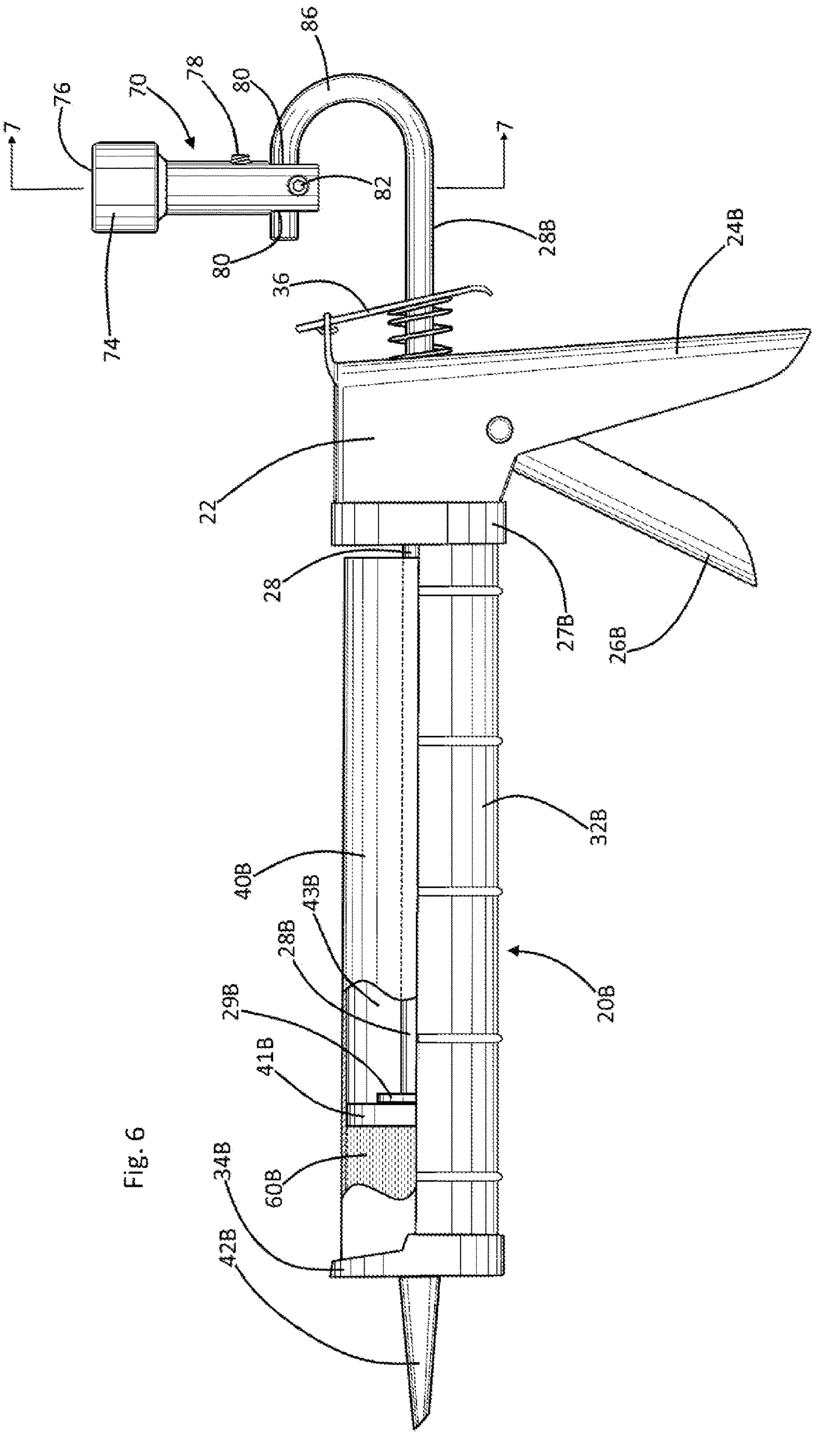
FIG. 6 presents an alternate configuration of structures presented in FIG. 5.
Figure 7:
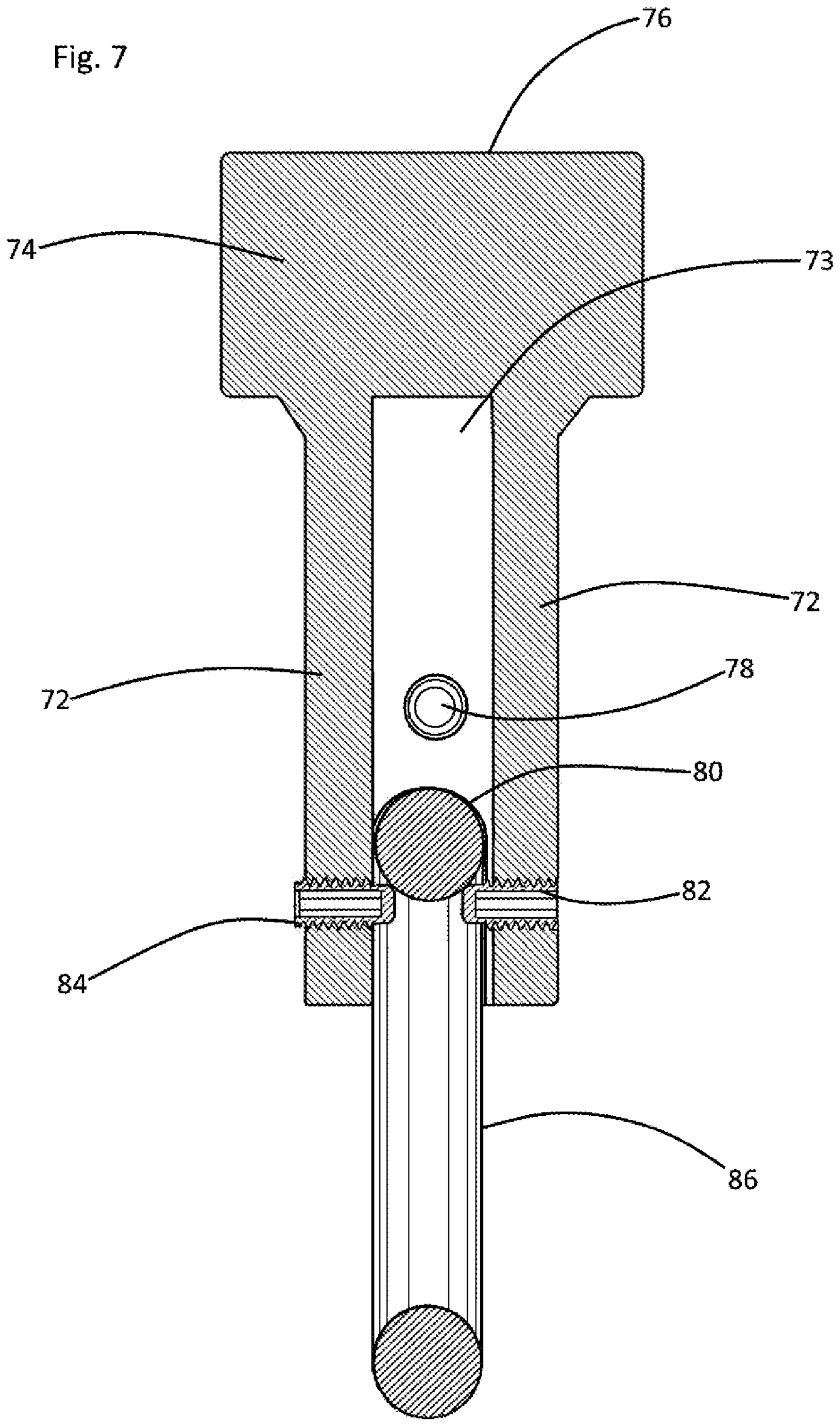
FIG. 7 is a sectional view as indicated in FIG. 6.

Referring simultaneously to FIGS. 5-7 structure identified by numerals having a suffix "B" are structurally similar to similarly numbered structures in FIGS. 1-3. The alternatively configured sleeve mountable nail setting adapter of FIGS. 5-7 is referred to generally by Reference Arrow 70. In such adapter 70, a hammerhead 74, a strikeface 76, a sleeve wall 72, a hollow bore 73, and a set screw 78 are configured similarly with and function similarly with the hammerhead 2, strikeface 3, sleeve wall 6, hollow bore 16, and set screw 8 of the sleeve mountable adapter 1 depicted in FIGS. 1-3. In the alternative adapter 70 of FIGS. 5-7, a pair of "U" slots 80 are milled into and through the proximal end of the sleeve wall 72. Such slots 80 are preferably fitted to closely and nestingly receive the upper arm of the plunger rod's "C" hook 86. The "V" slots 80 together form a "U" channel which facilitates the longitudinal passage of the "C" hook's arm.

Upon the "U" slots' receipt of the upper arm of the "C" hook 86, set screws 82 and 84 positioned between the "U" slots may be tightened against such arm as depicted in FIGS. 6 and 7. Alternatively, the "C" hook 86 may be preliminarily rotated to extend downwardly, and the "U" slots and set screws 82,84 may hold and clamp against the rearward end of the plunger rod 28B (such alternative configuration not being within views).

In use of the instant inventive caulking gun, and assuming an initial configuration as indicated in Drawing FIG. 1, an operator may grasp the receptacle 32 and the tube 40 with one hand while holding, for example, a ladder rung (not depicted within views) with the other hand. Thereafter, the operator may swing the caulking gun 20 in a manner of a hammer stroke, causing the strike face 4 of the hammerhead 2 to approach a raised nail head (not depicted within views) in need of resetting. Repeated striking of such strike face 4 against such nail head advantageously resets the nail without the requirement of awkwardly retrieving and utilizing a separate hammer tool.

Following utilization of the caulking gun 20 as a hammer, the operator may recommence use of the gun 20 for caulking. Upon emptying the tube 40, the operator may depress the lower end of retainer plate 36, and may utilize the fingers of his or her other hand to pull rearwardly upon sleeve 6. During such pulling action, the increased radius of curvature $R_2$ of sleeve 6 in relation to the lesser radius of curvature $R_1$ of the hook 30 advantageously provides ergonomic comfort which facilitates the rearward finger pull. Completion of such rearward pull advantageously retracts the driver plate 29 into the receptacle's rear shroud 27. Such sleeve assisted retraction allows the tube 40 to be withdrawn and disposed of, and allows a new caulk filled tube to be reinserted into receptacle 32.

FIGS. 5-7 show two alternative modes of mounting and use of the specialized hammerhead adapter 70. Where a caulk gun presents an "L" hook, as in FIG. 5, the adapter 70 may be attached in a manner substantially identical to the mode of mounting of the adapter 1 of FIGS. 1-3. Alternatively, where the hook is "C" configured, as in FIGS. 6 and 7, the adapter may be mounted to the "C" hook's upper arm or to plunger rod 28B in the manner depicted in FIGS. 6 and 7. In either mounting configuration of the adapter 70, nail head setting hammering use of the tool may proceed in the same manner described above with respect to the adapter 1 of FIGS. 1-3.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention claimed is:

1. A nail driving adapter for attachment to a caulk gun's pull handle, the nail driving adapter comprising:

(a) a hammerhead having a proximal end and a distal end;

(b) a sleeve having a wall, the sleeve further having a hollow bore having a distal end, the sleeve further having a proximal and a distal end, wherein the distal end of the sleeve is fixedly attached at the proximal end of the hammerhead, and wherein the proximal end of the hammerhead closes the distal end of the hollow bore;

(c) a first pull handle passage slot having parallel edges, said slot opening proximally at a proximal end of the sleeve's wall, and said first pull handle passage slot extending into the sleeve wall to a slot depth toward the sleeve's distal end;

(d) a second pull handle passage slot having parallel edges, said slot being positioned oppositely from the first pull handle passage slot, the second pull handle slot opening proximally at the proximal end of the sleeve's wall, and the second pull handle passage slot extending into the sleeve wall to the slot depth toward the sleeve's distal end;

(e) a plurality of set screws, each screw among the plurality of set screws extending through a threaded aperture within the sleeve's wall, said threaded aperture opening the hollow bore proximally from the hollow bore's distal end;

(f) wherein each pull handle passage slot comprises a "U" slot; and (g) a pull handle passage "U" channel, wherein said channel has a channel depth equal to the slot depth, and said channel extending between the first and the second pull handle passage slots.

2. The nail driving adapter of claim 1 wherein one of the set screws is positioned between the first and second pull handle passage slots.

3. The nail driving adapter of claim 2 wherein another of the set screws is positioned oppositely from the one of the set screws.

4. The nail driving adapter of claim 3 wherein a second other set screw is positioned distally from the first and second pull handle passage slots.

* * * * *